ABSTRACT OF THE DISCLOSURE

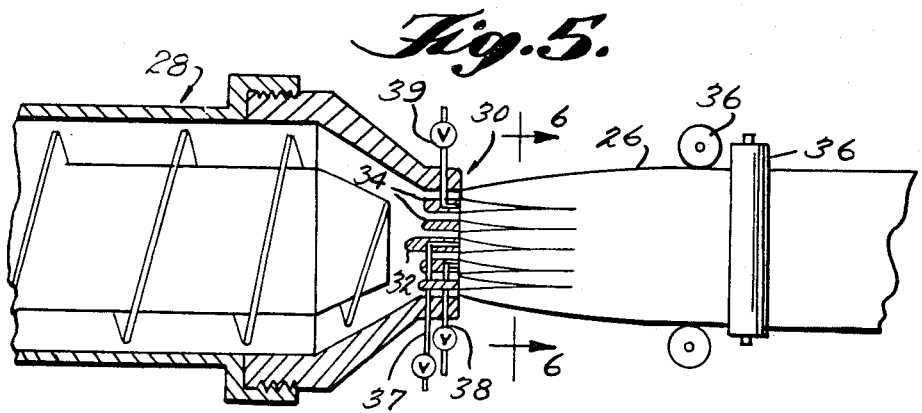
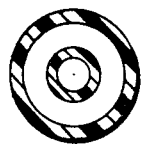
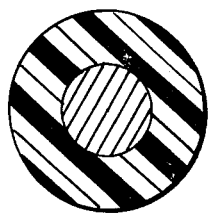
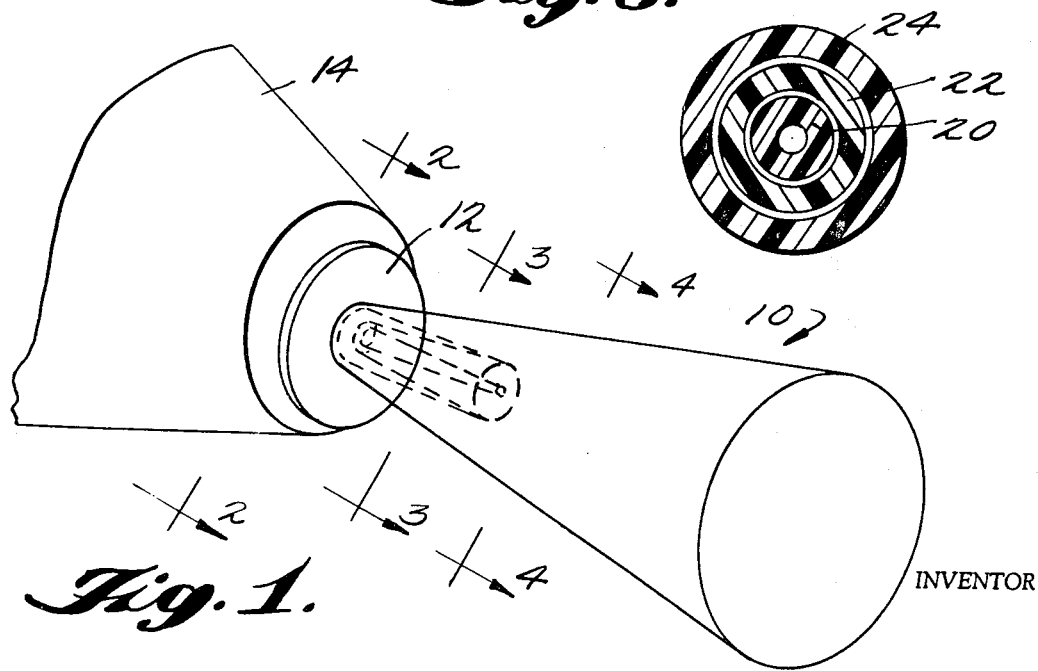
INVENTOR
ERNEST O. OHSOL
BY Cushman, Darby & Cushman
ATTORNEYS 3,413,387
CONCENTRIC EXTRUSION
Ernest O. Ohsol, Wilmington, Del., assignor to Haveg Industries, Inc., Wilmington, Del., a corporation of Delaware
Filed June 4, 1965, Ser. No. 461,351
5 Claims. (Cl. 264—46)

Thick foam plastic shapes, free from surface irregularities and density variations, are foarmed by extruding radially spaced-apart concentric tubes of foamable plastic in such a manner that upon foaming of the plastic the walls of the tubes expand to close the radial spaces. The shape may then be slightly compressed at right angles to the direction of extrusion.

Disclosure

This invention relates to the formation of thick bodies of foamed plastic material. More in particular, it relates to an extrusion process for forming thick foamed plastic rod-like bodies having uniform density throughout and freedom from surface irregularities.

It is known that relatively thin foam plastic sheets and small diameter rods or the like can be produced by extrusion of foamable plastic material with ordinary extrusion techniques. For example, both sheets and rods can be produced by extruding the foamable material through a die of suitable configuration, a die having a slot-shaped orifice being employed for sheets and a die of more uniform transverse shape being employed for rods. Additionally, foam sheet may be made by extruding the plastic material in the form of a relatively thin walled tube and subsequently splitting the tube lengthwise. Foam plastic extrusions find utility in the fields of thermal insulation, package construction and boat or other buoyant construction.

The conventional extrusion techniques referred to above are suitable for producing sheet-like or rod-like shapes of relatively small thickness. When the thickness is large, however, the extruded mass tends to develop surface irregularities and undesirable variations in density in the transverse direction. These defects apparently result from the expansion of the plastic material at right angles to the direction of extrusion. In the case of thin shapes all or substantially all the plastic is free to expand to its full extent, but in thicker shapes expansion of the innermost plastic tends to be contained or repressed by the outer layer of plastic thus producing density differences. In any event, regardless of the mechanism of expansion, thick extruded sheets tend to develop surface corrugations when the plastic expands. In the case of extruded thick rods surface cracks or splits tend to develop. The thickness beyond which these difficulties develop varies with process conditions such as the expansion ratio of the material being extruded, extrusion rate and die shape. In general the undesirable features appear when the thickness exceeds about 1/10 inch.

It is the object of the present invention to provide an improved process for making thick foam plastic shapes which are free from the surface irregularities and density variations usually associated with thick foam extrusions, the process comprising extruding a foamable plastic in the form of a central element and one or more radially spaced apart concentric tubes in such a manner that upon complete or substantially complete foaming of the plastic material the walls of the tubes expand uniformly to close or substantially close the annuli within the mass. The final foamed body, usually after being slightly compressed at right angles to the direction of extrusion, is solid in the sense that it has no continuous hole extending therethrough in the direction of extrusion.

The process of the present invention is particularly adapted to the manufacture of thick rod-like bodies which are circular or square in cross section or which otherwise have generally uniform dimensions in different transverse directions. However, the concentric tube concept which is the principal feature of the invention is applicable to making rods which are of more elongated transverse cross section. In general the process is suitable for making rods up to about 6 inches in thickness.

The central extruded element around which the concentric tube or tubes are extruded may be a tube in which case its bore will close upon foaming of the plastic, or it may be a small diameter rod of initial solid cross section. In either case the desired uniformity of density and the proper closing of the annulus or annuli depends on a proper selection of the thickness of the central element and the concentric elements and the radial spacing between the various elements.

The invention will be further understood from the following detailed description taken with the drawings in which:

FIGURE 1 is a schematic perspective view illustrating the production of a thick cylindrical rod of foam plastic by an extrusion process embodying the principles of the present invention;

FIGURE 2 is a sectional view, taken on the line 2—2 of FIGURE 1, illustrating the cross sectional shape of the plastic immediately after extrusion;

FIGURES 3 and 4 are sectional views taken on the lines 3—3 and 4—4, respectively, of FIGURE 1;

FIGURE 5 is a longitudinal vertical sectional view of an extruder and associated equipment for making a thick foam plastic rod; and FIGURE 6 is a sectional view taken on the line 6—6 of FIGURE 5.

In FIGURE 1 there is illustrated schematically the extrusion of a foam plastic mass 10 from a die plate 12 of an extruder 14. The mass 10 is extruded through a die orifice (not shown) of double annular shape in the form of inner and outer concentric tubes 16 and 18 of circular transverse cross section. Immediately upon issuance of the plastic from the extruder 14 the material, which is a conventional foamable composition, foams and begins to expand, complete expansion taking place rather rapidly. Generally the final cross sectional area transverse to the direction of extrusion will be about 3 to 10 times the cross sectional area of the initially extruded mass, although this ratio will vary with the expansion ratio of the plastic and process variables such as extrusion rate.

According to the principles of the present invention the transverse configuration of the initially extruded tubes 16 and 18 is chosen so that the subsequent expansion of the plastic material at right angles to the direction of extrusion will close or substantially close the bore of the inner tube 16 and the annulus between the tubes 16 and 18. In the embodiment illustrated, and as shown in FIGURE 2, the initially extruded tubes 16 and 18 have wall thicknesses which are about equal to each other and which are about twice the diameter of the inner tube 16 and twice the width of the annulus between the tubes 16 and 18. This relationship is not mandatory, however, and is given only by way of example.

FIGURES 3 and 4 illustrate the change in cross section of the extruded mass 10 as foaming and expansion of the plastic material occur. In FIGURE 3 it will be seen that the width of the annulus between the tubes 16 and 18 has diminished to about one-half its original width.

FIGURE 4 illustrates the solid cross section which desirably appears upon complete expansion of the plastic material. If the plastic expands somewhat more than is necessary to close the bore and annulus there may be a slight non-uniformity of density across the final mass 10, but this can be tolerated if the excess expansion is not great. Rolling of the fully expanded mass is generally desirable for assuring that the plastic will coalesce along the junctions between the tubes. Rolling is particularly desirable where the expansion of the plastic is slightly less than sufficient to completely close the bore and annulus.

FIGURES 5 and 6 illustrate an apparatus and process for extruding three concentric circular plastic tubes 20, 22 and 24 which foam and expand to form a cylindrical rod 26. As shown, a conventional screw extruder 28 is provided with a die 30 having a mandrel portion 32 and two concentric ribs 34 which define, respectively, the bore of the inner tube 20 and the two outer annuli in the freshly extruded mass. Rollers 36 are provided downstream of the point of complete expansion to apply slight radial compression to the mass and assure coalescence of the tubes 20, 22 and 24 with each other. Pressure control vents 37, 38 and 39 are provided to hold the pressure of the gas bubble trapped between successive annular layers of foam at a desirable level.

In making the foam rods of the present invention there can be employed many different types of plastics.

When employing polystyrene there can be employed normal crystal grade polystyrene or high impact polystyrene or a mixture containing 5 to 95% normal crystal grade polystyrene and the balance high impact polystyrene. When employing a thermoplastic styrene polymer it normally contains greater than 50% by weight of styrene and preferably at least 70% by weight of styrene in its structure. Preferably, the polystyrene is at least 10% high impact polystyrene. High impact polystyrenes are frequently prepared by polymerizing monomeric styrene in the presence of 2 to 15% by weight of a rubbery diene polymer or by polymerizing styrene in the presence of such amounts of a difunctional material. Examples of high impact styrene include a terpolymer of 5% acrylonitrile, 5% butadiene and 90% styrene; a copolymer of 5% butadiene and 95% styrene; the product made by polymerizing 95% of styrene in the presence of 5% of polybutadiene; a copolymer of 5% chlorosulfonated polyethylene and 95% styrene; a blend of 97.5% polystyrene and 2.5% polybutadiene; a blend of 95% polystyrene and 5% hydrogenated polybutadiene containing 35.4% residual unsaturation; polystyrene formed in the presence of 5% hydrogenated polybutadiene containing 4.5% of residual unsaturation, a blend of 95% polystyrene and 5% polyisoprene, a blend of 98% polystyrene with 2% rubbery butadiene-styrene copolymer, a blend of 85% polystyrene with 15% rubbery butadiene-styrene copolymer, and a copolymer of 99.5% styrene and 0.5% divinyl benzene.

Unless otherwise indicated, all parts and percentages are by weight.

Other suitable thermoplastic resins and polymers include chlorinated rubber, cellulose ethers and esters, e.g., ethyl cellulose, cellulose acetate, cellulose acetate-butyrate, bituminous materials, e.g., asphalt and coal tar pitch, paraffin wax, homopolymers and interpolymers of monomeric compounds containing the $CH_2=C$ grouping, such as olefins, e.g., ethylene, propylene, isobutylene, butene-1, vinyl halides, e.g, vinyl chloride and vinyl fluoride, vinylidene chloride; vinyl esters of carboxylic acids, e.g, vinyl acetate, vinyl stearate, vinyl benzoate, vinyl ethers, e.g., vinyl methyl ether, vinyl ethyl ether, vinyl isobutyl ether; chlorotrifluoroethylene, tetrafluoroethylene, hexafluoropropylene, unsaturated carboxylic acids and derivatives thereof, e.g., acrylic acid, methacrylic acid, methyl acrylate, methyl alpha chloroacrylate, ethyl acrylate, methyl methacrylate, acrylamide, acrylonitrile, methacrylonitrile, and interpolymers of the above-mentioned vinylidine monomers with alpha, beta-unsaturated polycarboxylic acids and derivatives thereof, e.g., maleic anhydride, diethyl maleate, dibutyl fumarate, diallyl maleate, dipropyl maleate, etc. A preferred class of materials with which optimum results are obtained are rigid, relatively nonelastic, thermoplastic resins such as homopolymers and interpolymers of vinyl chloride, e.g, polyvinyl chloride, vinyl chloride-vinyl acetate copolymer (87:13), vinyl chloride-acrylonitrile copolymer (80:20); homopolymers of vinyl aromatic hydrocarbons and ring halogenated derivatives thereof, e.g., styrene, o-chlorostylrene p-chlorostyrene, 2,5-dichlorostyrene, 2,4-dichlorostyrene, p-methylstyrene, p-ethylstyrene, alpha methylstyrene, vinyl naphthalene and interpolymers of such vinyl monomers with each other and with other vinyl monomers in which the interpolymer contains at least 70% of the vinyl aromatic hydrocarbon compound, e.g., a copolymer of 70% styrene and 30% acrylonitrile. As previously indicated, for many uses the most preferred resins are thermoplastic styrene polymers containing at least 70% by weight styrene in the structure.

Additional suitable thermoplastic resins include polycarbonates, e.g., the polymer from bisphenol A and diphenyl carbonate; polyoxymethylene (Delrin), oxymethylene-alkylene oxide copolymers, e.g., oxymethylene-ethylene oxide (95:5), polyurethanes, e.g., prepolymers from toluene diisocyanate and polypropylene glycol molecular weight 2025; or glycerine propylene adduct molecular weight 3000 or butane diol 1,4-adipic acid polyester; Dacron (polyethylene terephthalate), nylon (e.g., polymeric hexamethylene adipamide). ABS terpolymers can be used, e.g., the terpolymer of 25% butadiene, 15% acrylonitrile and 60% styrene (a rigid ABS terpolymer), as well as other terpolymers containing 25 to 60% butadiene, 10 to 20% acrylonitrile, and 20 to 60% styrene.

The present invention is of particular value in preparing foamed articles from polyethylene (of high density, e.g., 0.960, medium density, e.g., 0.935 or low density, e.g., 0.914), polypropylene, copolymers of ethylene and propylene (e.g., 50:50 copolymer, 60:40 copolymer and 20:80 copolymer), regular or high impact polystyrene, acrylonitrile-butadiene-styrene terpolymer, polyvinyl chloride (preferably rigid polyvinyl chloride), copolymers of ethylene with minor amounts of alpha olefins having 4 to 10 carbon atoms such as butene-1 (e.g., 90:10 and 97.5:2.5) or octene-1 (96:4); terpolymers of ethylene, propylene and up to 5% of a nonconjugated polyolefin such as alloocimene, pentadiene-1,4 and dicyclopentadiene, e.g., a terpolymer of 60% ethylene, 39% propylene and 1% dicyclopentadiene or pentadiene 1,4.

There can also be prepared foamed articles from fluorocarbon polymers such as polytetrafluoroethylene, polyhexafluoropropylene and tetrafluoroethylene-hexafluoropropylene copoplymer (e.g., 50:50).

In forming the foamed plastic, there is preferably utilized a nucleating agent, e.g., in an amount of from 0.02 to 10%, preferably 0.4 to 5% of the weight of the polymer.

Conventionally, the nucleating agents are made up of two materials which react to form carbon dioxide and water. The two materials are normally used in approximately equivalent amounts. As the carbon dioxide liberating materials there can be used ammonium, alkali and alkaline earth carbonates or bicarbonates, e.g., ammonium bicarbonate, sodium bicarbonate, sodium carbonate, potassium bicarbonate, calcium carbonate. The other material is an acid or acid-reacting salt, preferably solid, which is sufficiently strong to liberate the carbon dioxide from the carbonate or bicarbonate. Generally, the acid has at least 3.0 milliequivalents or acidic hydrogen, and preferably at least 10.0 milliequivalents, per gram. The acid can be organic or inorganic. Suitable acidic materials include boric acid, sodium dihydrogen phosphate, fumaric acid, malonic acid, oxalic acid, citric acid, tartaric acid, potassium acid tartrate, chloroacetic acid, maleic acid, succinic acid, glutaric acid and phthalic acid. In place of the anhydrous acids or salts there can be used the solid hydrates, e.g., oxalic acid dihydrate and citric acid monohydrate.

While not essential, there can also be added a wetting agent such as Bayol 35 (a petroleum aliphatic hydrocarbon white oil), kerosene having an average of at least 8 carbon atoms in the molecule, alkylphenolalkylene oxide adducts e.g., Triton X100 (t-octyl-phenol-ethylene oxide adduct having 10 ethylene oxide units in the molecule), sodium lauryl sulfate and sodium dodecylbenzene sulfonate. The wetting agent can be nonionic or anionic.

One mode of incorporating the foaming agent into the polymer is by premixing the pelletized, solid, thermoplastic polymer, e.g., high impact styrene polymer, with a minor amount of an absorbent having absorbed thereon a volatile liquid (i.e., the foaming agent) which is non-reactive with and which has not more than a slight solvent action on the polymer. The volatile liquid should volatilize below the softening point of the polymer.

As the absorbent there can be employed any conventional absorbent in finely divided form, such as diatomaceous earth (Celite), fuller's earth, silica gel, e.g., Cab-O-Sil and Hi-Sil, activated alumina, molecular sieves, attapulgite clay and activated carbon. The absorbent is usually used in an amount of 0.1 to 15%, preferably 0.5 to 10% by weight of the polymer, although up to 25 or 30% of absorbent can be employed. The absorbent is an inert filler of large surface area but small particle size, e.g., 200 mesh or below.

As the volatile liquid there can be used aliphatic hydrocarbons boiling between 10° and 100° C. and preferably between 30° and 90° C., e.g., petroleum ether (containing primarily pentane or hexane or a mixture of these hydrocarbons), pentane, hexane, isopentane, butane, heptane, cyclohexane, cyclopentane, pentadiene and neopentane. Other volatile liquids include methanol, ethanol, methyl acetate, ethyl acetate, butane acetone, methyl formate, ethyl formate, dichloroethylene, dichlorodifluoromethane, perchlorothylene, dichlorotetrafluoroethane, isopropyl chloride, carbontetrachloride, monochlorotrifluorethylene, propionaldehyde, diisopropyl ether, dichlorodifluoromethane, a mixture of pentane with 5 to 30% of methylene chloride or other volatile lower halogenated hydrocarbon.

The amount of volatile liquid absorbed on the absorbent can vary from 5 to 150% or more based on the weight of the absorbent. The amount of liquid absorbed will depend upon the capacity of the absorbent for the particular liquid. Normally, the absorbent containing the volatile liquid will appear to be a dry powder. The volatile liquid employed should be one which is nonreactive with the particular polymer employed. Usually, the amount of volatile liquid will be 0.1 to 15% by weight of the polymer to be expanded. The amount of volatile liquid will depend upon the extent of foaming desired. In general, the greater the amount of absorbed volatile liquid in the polymer-absorbent mixture the more the expansion. It has been found that good expansion can be obtained using very small amounts of the volatile liquid.

The free-flowing powder consisting of the low boiling solvent or semi-solvent absorbed on the inert filler of large surface area is added to the extrusion grade plastic pellets, preferably along with the nucleating agent, and tumbled in a mixer. The powder containing the volatile blowing agent will then disperse uniformly throughout the mixture while adhering to the plastic pellets. The mixture is then fed into the hopper of a screw extruder.

Instead of absorbing the volatile liquid on a filler, there can be employed conventional expansible thermoplastic materials such as expansible polystyrene containing 1 to 9% of one of the volatile liquids, e.g., Dow-Pelespan 101 (expansible polystyrene beads containing 6% pentane).

While specific embodiments of process steps and materials have been described, the details thereof are not intended to be limiting except as they appear in the appended claims.

What is claimed is:

1. In a process for extruding a thick body of foamed plastic material having uniform density in transverse directions and freedom from surface irregularities, the improvement which comprises: extruding a foamable plastic material in the form of a continuous central element; simultaneously extruding a foamable plastic material in the form of at least one concentric continuous outer tube spaced apart from said central element and defining an annulus therewith; and then at least substantially closing said annulus by foaming said extruded plastic material to fill said annulus with foamed plastic material.

2. A process for extruding a thick rod-like body of foamed plastic material which in its final form is free of continuous holes extending in the direction of extrusion and which has uniform density and smooth external surfaces, said process comprising extruding foamable plastic material in the initial form of a continuous central element having generally the same dimension in different transverse directions; simultaneously extruding foamable plastic material in the initial form of at least one continuous outer tubular element which is concentric with and spaced apart from said central element and defining an annulus therewith; and then substantially closing said annulus by foaming said initially extruded elements and expanding the same in a direction transverse to the direction of extrusion until the wall of said tubular element and the outer surface of said central element substantially engage each other.

3. A process as in claim 2 including the step of compressing the extruded body after foaming thereof to insure coalescence of the wall of said tubular element with said central element.

4. A process as in claim 2 wherein said elements are expanded to produce a rod-like body at least 1/10 inch thick.

5. A process as in claim 2 wherein a plurality of concentric tubular members are simultaneously extruded over said central element, there being an annulus formed between each adjacent pair of tubular members.

References Cited

UNITED STATES PATENTS

| 2,932,323 | 4/1960 | Aires | 156—244 XR |
| 3,082,484 | 3/1963 | Sherman | 18—14 |
| 3,121,130 | 2/1964 | Wiley et al. | 264—53 |
| 3,184,358 | 5/1965 | Utz | 18—14 |
| 3,212,154 | 10/1965 | Crumpler | 18—14 |

JULIUS FROME, *Primary Examiner.*

P. E. ANDERSON, *Assistant Examiner.*